United States Patent
Ishikawa

(10) Patent No.: US 12,014,756 B2
(45) Date of Patent: Jun. 18, 2024

(54) TAPE REEL, MAGNETIC TAPE CARTRIDGE, AND MAGNETIC TAPE DRIVE

(71) Applicant: FUJIFILM CORPORATION, Tokyo (JP)

(72) Inventor: Ren Ishikawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/341,769

(22) Filed: Jun. 27, 2023

(65) Prior Publication Data
US 2024/0005954 A1    Jan. 4, 2024

(30) Foreign Application Priority Data

Jul. 4, 2022    (JP) .................. 2022-108036

(51) Int. Cl.
*G11B 23/04*    (2006.01)
*G11B 5/55*    (2006.01)

(52) U.S. Cl.
CPC .................. *G11B 5/5508* (2013.01)

(58) Field of Classification Search
CPC . G11B 23/107; G11B 23/087; G11B 15/6653; G11B 15/32; G11B 23/044; G11B 23/027; G11B 23/037; G11B 23/08728; G11B 15/615; G11B 5/78; B65H 75/18; B65H 75/14

USPC .................................... 360/85, 96.3
See application file for complete search history.

(56) References Cited

U.S. PATENT DOCUMENTS 7,290,734 B2 *  11/2007  Sasaki .................. G11B 23/043
                                                        242/348
2005/0077409 A1    4/2005  Brown et al.

FOREIGN PATENT DOCUMENTS

JP        2005-116163 A       4/2005

* cited by examiner

*Primary Examiner* — Nabil Z Hindi
(74) *Attorney, Agent, or Firm* — SOLARIS Intellectual Property Group, PLLC

(57) ABSTRACT

A tape reel includes a hub that has a cylindrical shape and around which a tape is wound, and a reinforcing member provided on an inner peripheral side of the hub, in which the reinforcing member includes a shaft member having a longitudinal direction along a central axis direction of the hub, and a plurality of ribs that are provided along the longitudinal direction and have an annular shape that extends from an outer peripheral surface of the shaft member toward an inner peripheral surface of the hub, and the plurality of ribs include a first rib provided in a central region in the longitudinal direction.

13 Claims, 12 Drawing Sheets

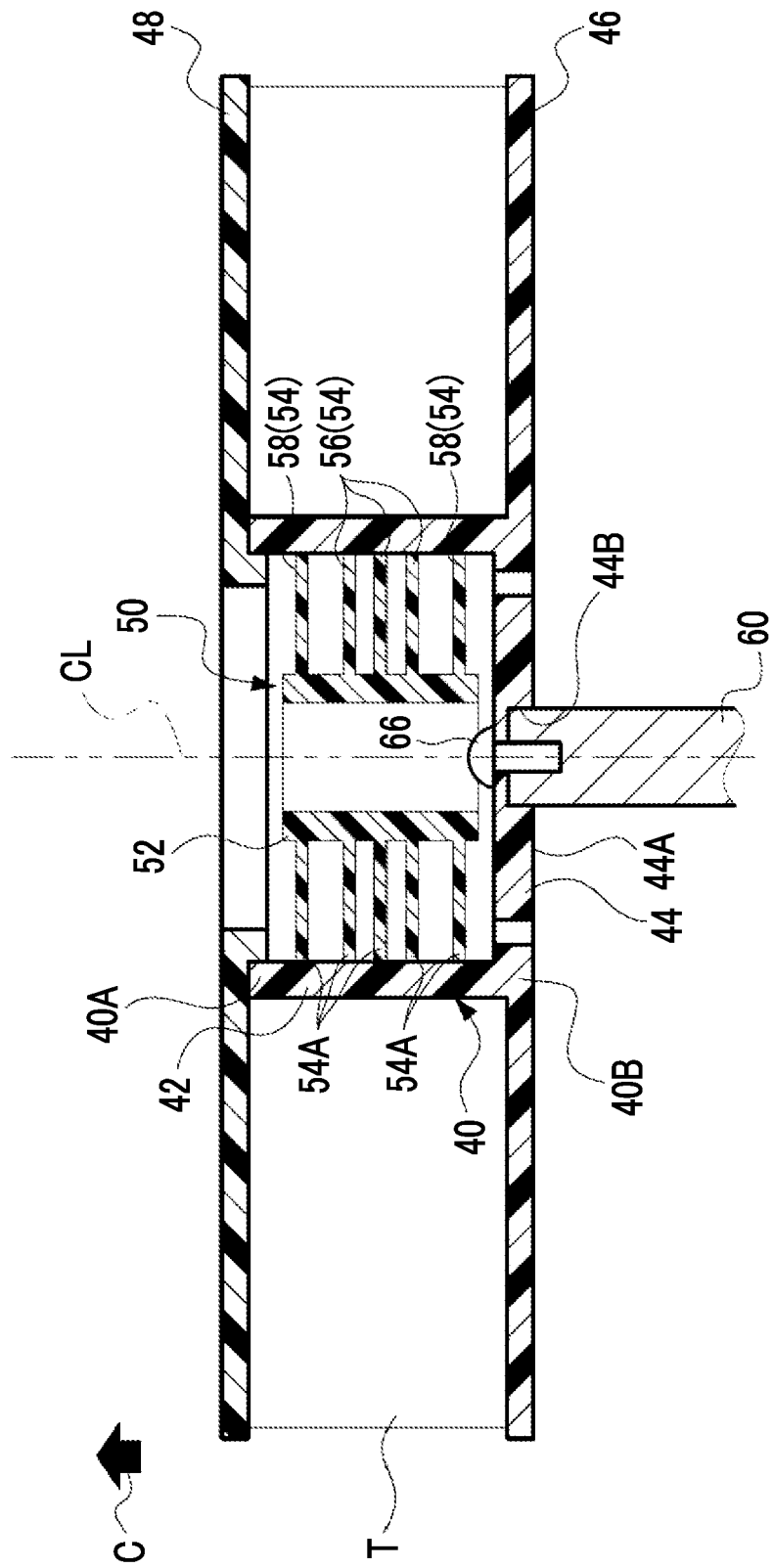

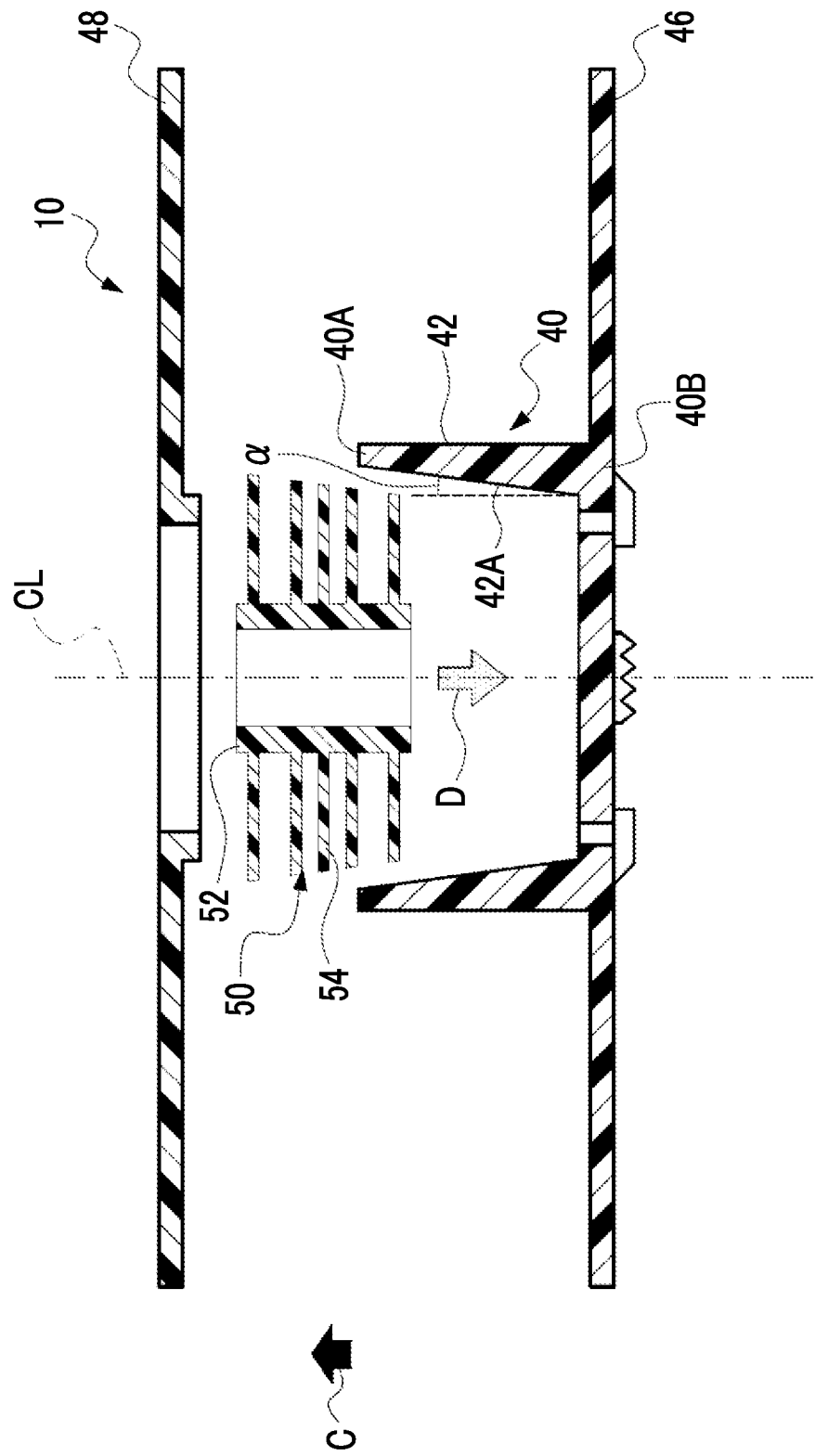

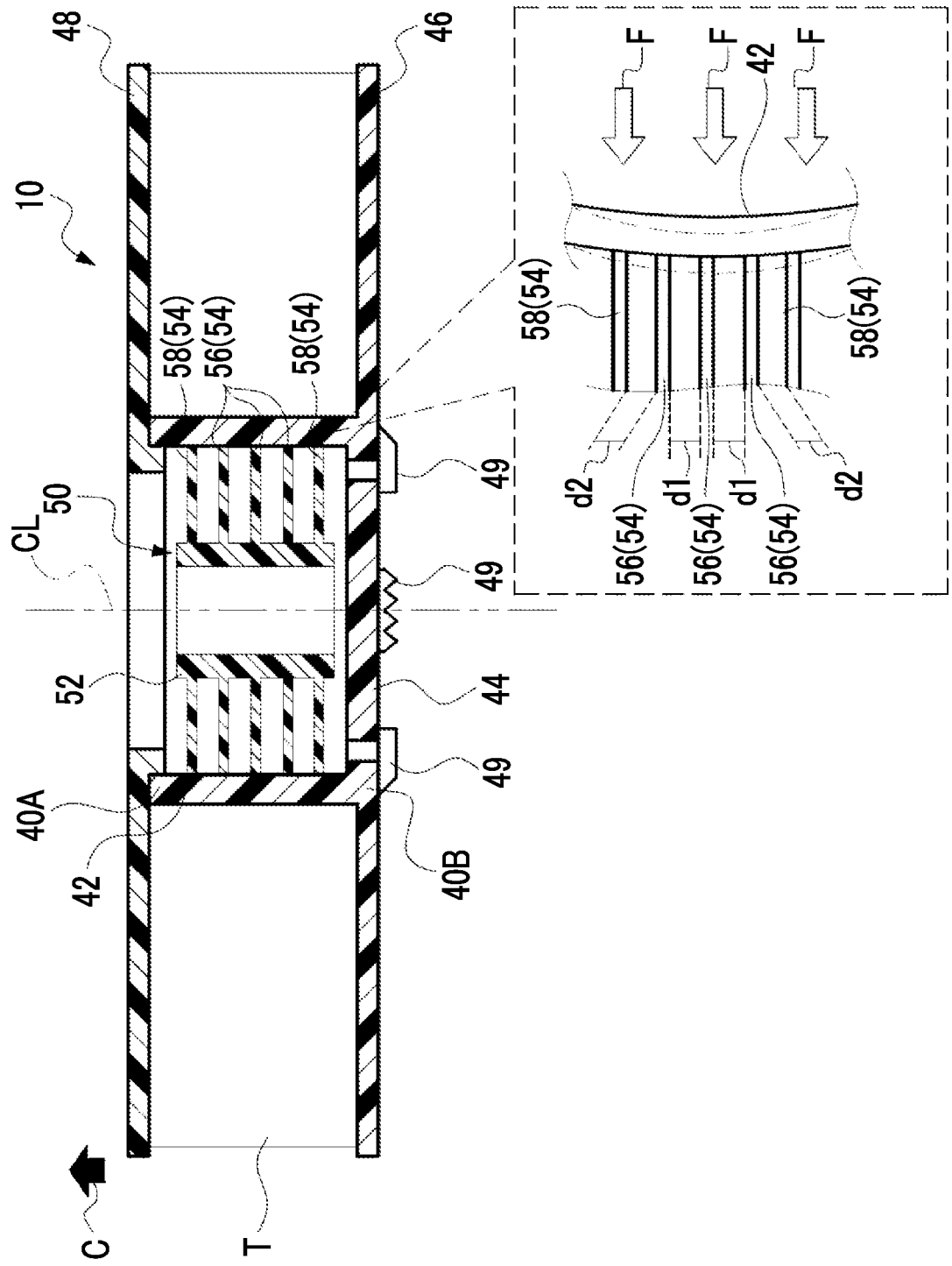

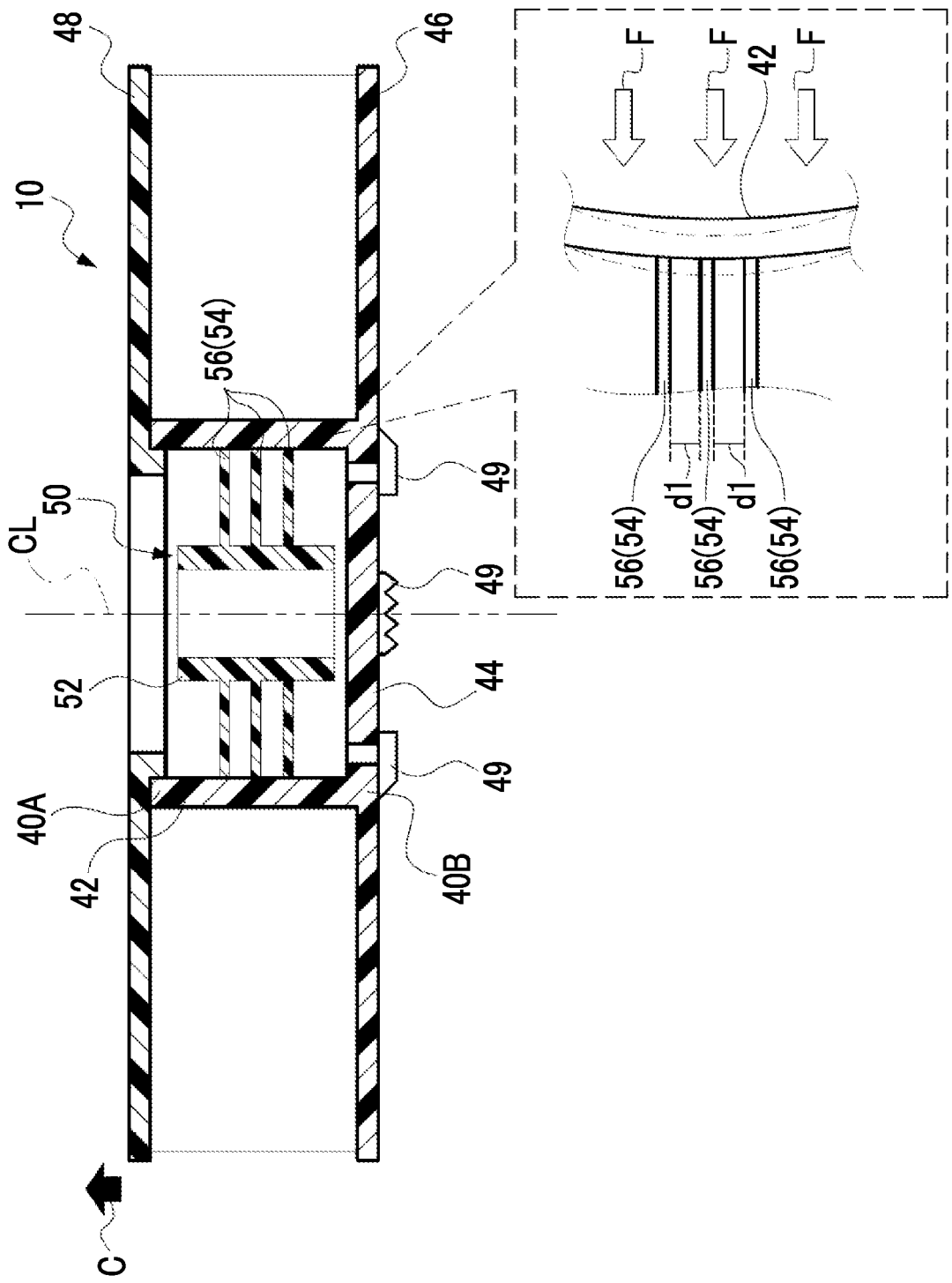

TAPE REEL, MAGNETIC TAPE CARTRIDGE, AND MAGNETIC TAPE DRIVE

CROSS-REFERENCE TO RELATED APPLICATION

This application claims priority from Japanese Patent Application No. 2022-108036, filed Jul. 4, 2022, the disclosure of which is incorporated herein by reference in its entirety.

BACKGROUND

Technical Field

The technology of the present disclosure relates to a tape reel, a magnetic tape cartridge, and a magnetic tape drive.

Related Art

JP2005-116163A discloses a tape reel assembly for winding and unwinding a storage tape having a hub defining an inner surface and a tape winding surface, in which at least a part of the hub is made of plastic, and the tape winding surface has an effective radial modulus greater than 2 GPa.

SUMMARY

One embodiment according to the technology of the present disclosure provides a tape reel, a magnetic tape cartridge, and a magnetic tape drive capable of reducing non-uniform deformation of a width of a magnetic tape due to a non-uniform stress distribution that occurs in the magnetic tape wound around a hub.

A first aspect according to the technology of the present disclosure relates to a tape reel comprising a hub that has a cylindrical shape and around which a tape is wound, and a reinforcing member provided on an inner peripheral side of the hub, in which the reinforcing member includes a shaft member having a longitudinal direction along a central axis direction of the hub, and a plurality of ribs that are provided along the longitudinal direction and have an annular shape that extends from an outer peripheral surface of the shaft member toward an inner peripheral surface of the hub, and the plurality of ribs include a first rib provided in a central region in the longitudinal direction.

A second aspect according to the technology of the present disclosure relates to the tape reel according to the first aspect, in which the plurality of ribs include a second rib provided in a region other than the central region.

A third aspect according to the technology of the present disclosure relates to the tape reel according to the second aspect, in which the second rib is provided in each of a region between the central region and one end of the shaft member and a region between the central region and the other end of the shaft member.

A fourth aspect according to the technology of the present disclosure relates to the tape reel according to the second or third aspect, in which axial rigidity of the first rib is higher than axial rigidity of the second rib.

A fifth aspect according to the technology of the present disclosure relates to the tape reel according to any one of the first to third aspects, in which a plurality of the first ribs are provided.

A sixth aspect according to the technology of the present disclosure relates to the tape reel according to the fifth aspect, in which an interval between the first ribs is narrower than an interval between the second rib and the first rib.

A seventh aspect according to the technology of the present disclosure relates to the tape reel according to any one of the first to sixth aspects, in which an outer edge portion of the rib abuts against the inner peripheral surface.

An eighth aspect according to the technology of the present disclosure relates to the tape reel according to any one of the first to seventh aspects, in which the rib has a continuous annular shape.

A ninth aspect according to the technology of the present disclosure relates to the tape reel according to any one of the first to eighth aspects, in which the reinforcing member is press-fitted into the hub.

A tenth aspect according to the technology of the present disclosure relates to the tape reel according to any one of the first to ninth aspects, in which the reinforcing member is bonded to the hub.

An eleventh aspect according to the technology of the present disclosure relates to the tape reel according to any one of the first to tenth aspects, in which a support surface on which a rotation shaft that rotates the tape reel is fixed or attached is provided on a bottom portion of the hub.

A twelfth aspect according to the technology of the present disclosure relates to a magnetic tape cartridge comprising the tape reel according to any one of the first to eleventh aspects around which a magnetic tape is wound as the tape, and a case in which the magnetic tape and the tape reel are accommodated.

A thirteenth aspect according to the technology of the present disclosure relates to a magnetic tape drive comprising the tape reel according to any one of the first to eleventh aspects around which a magnetic tape is wound as the tape, and a magnetic head that reads the magnetic tape on a predetermined path in a state in which the magnetic tape is caused to travel by a travel mechanism that causes the magnetic tape to travel along the predetermined path.

BRIEF DESCRIPTION OF THE DRAWINGS

FIG. 9 is a cross-sectional view showing an example of a schematic configuration of a machine reel according to the present embodiment.

FIG. 10 is a cross-sectional view showing an example of a schematic configuration of a cartridge reel according to a modification example.

FIG. 11 is a cross-sectional view showing an example of the schematic configuration of the cartridge reel according to the modification example.

FIG. 12 is a cross-sectional view showing an example of the schematic configuration of the cartridge reel according to the modification example.

DETAILED DESCRIPTION

Figure 1:
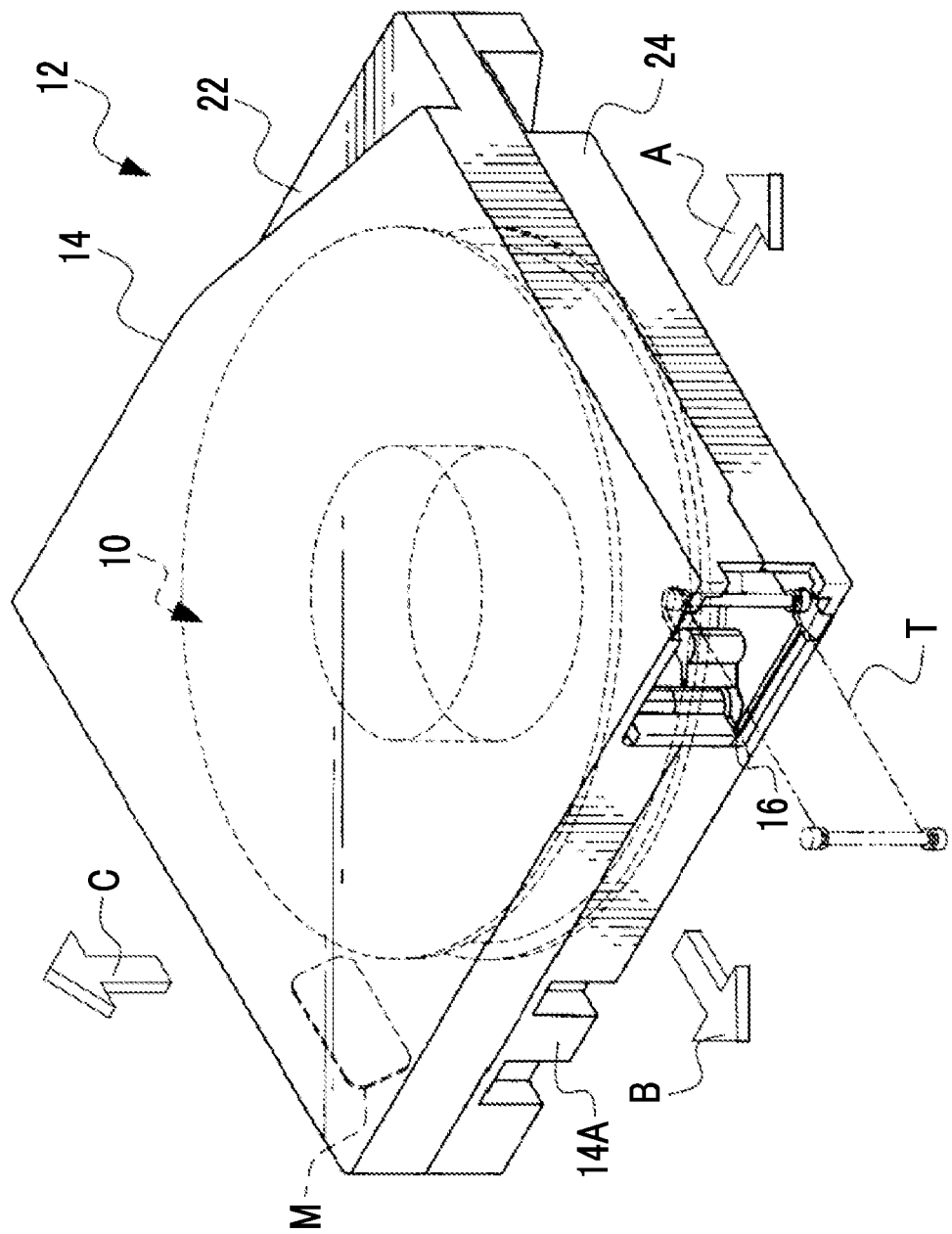
FIG. 1 is an external perspective view showing an example of a schematic configuration of a magnetic tape cartridge according to the present embodiment.

First, the terms used in the following description will be described.

NVM refers to an abbreviation of "non-volatile memory". CPU refers to an abbreviation of "central processing unit". RAM refers to an abbreviation of "random access memory". EEPROM refers to an abbreviation of "electrically erasable and programmable read only memory". HDD refers to an abbreviation of "hard disk drive". ASIC refers to an abbreviation of "application specific integrated circuit". FPGA refers to an abbreviation of "field-programmable gate array". PLC is an abbreviation of "programmable logic controller". IC refers to an abbreviation of "integrated circuit". RFID refers to an abbreviation of "radio frequency identifier". UI refers to an abbreviation of "user interface". WAN refers to an abbreviation of "wide area network". LAN refers to an abbreviation of "local area network".

First Embodiment

An example of a configuration of the magnetic tape cartridge 12 will be described with reference to FIGS. 1 and 2. It should be noted that, in the following description, for convenience of description, a loading direction of the magnetic tape cartridge 12 into a magnetic tape drive 70 (see FIG. 8) is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the following description of the structure, "front" refers to the front side of the magnetic tape cartridge 12.

In addition, in the following description, for convenience of description, a direction of an arrow B orthogonal to the direction of the arrow A is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following description, for convenience of description, a direction opposite to the direction of the arrow B is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following description, for convenience of description, a direction orthogonal to the direction of the arrow A and the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

As an example, as shown in FIG. 1, the magnetic tape cartridge 12 has a substantially rectangular shape in a plan view, and comprises a box-shaped case 14. In the present embodiment, the magnetic tape cartridge 12 is an example of a "magnetic tape cartridge" according to the technology of the present disclosure, and the case 14 is an example of a "case" according to the technology of the present disclosure. A magnetic tape T is accommodated in the case 14. For example, the case 14 is made of resin, such as polycarbonate, and comprises an upper case 22 and a lower case 24.

The magnetic tape cartridge 12 accommodates a cartridge reel 10 around which the magnetic tape T as a recording tape, which is an information recording/reproducing medium, is wound in the case 14 having a substantially rectangular shape in a plan view. In the present embodiment, the magnetic tape T is an example of a "tape" and a "magnetic tape" according to the technology of the present disclosure, and the cartridge reel 10 is an example of a "tape reel" according to the technology of the present disclosure.

An opening 16 for pulling out the magnetic tape T to the outside of the case 14 is provided in a front end portion of a right side wall 14A of the case 14. The opening 16 is blocked by a door 18 in a case in which the magnetic tape cartridge 12 is not in use. In addition, the opening 16 is open in the magnetic tape drive 70 (see FIG. 8) in a case in which the magnetic tape cartridge 12 is used.

Figure 2:
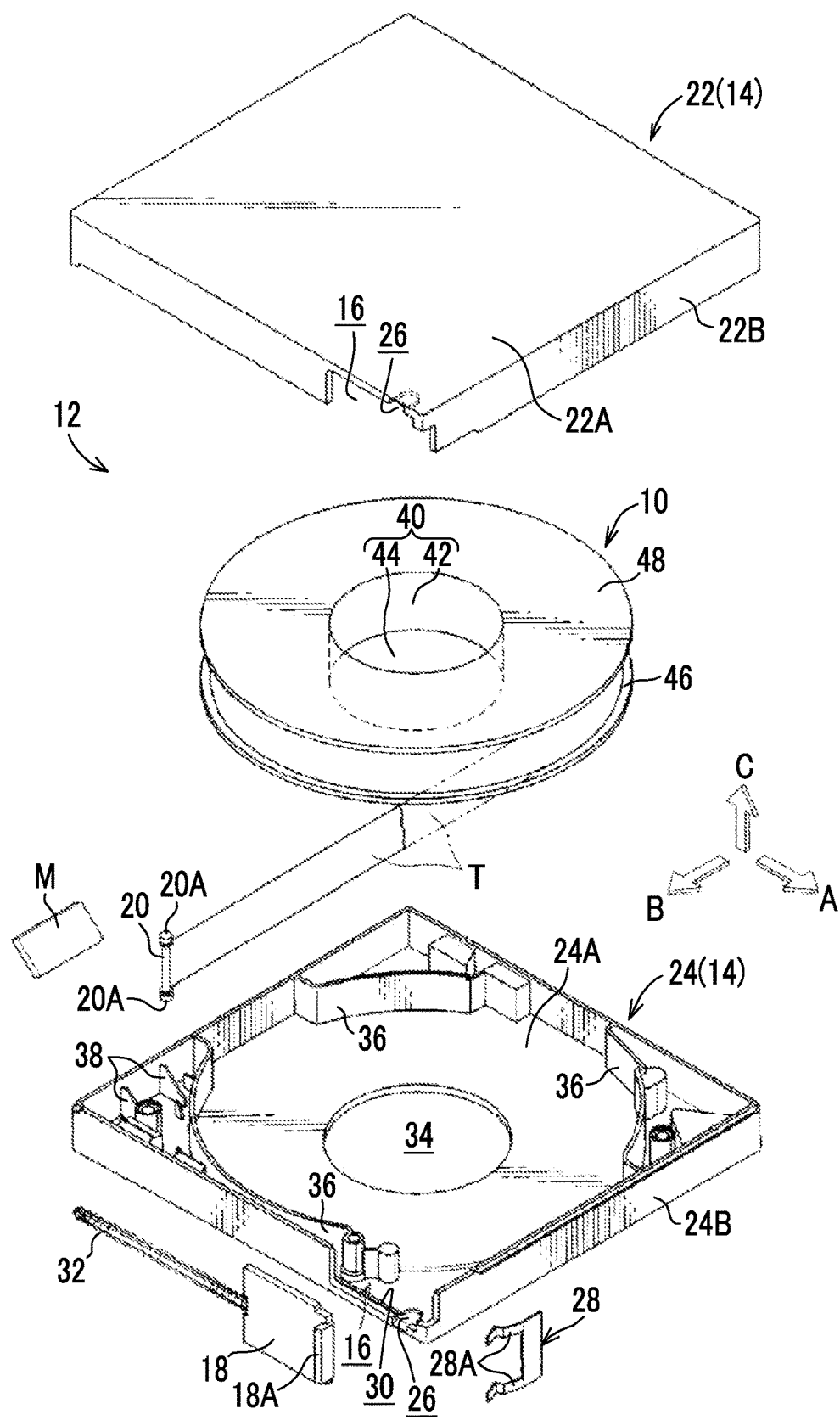
FIG. 2 is an exploded perspective view showing an example of the schematic configuration of the magnetic tape cartridge according to the present embodiment.

As shown in FIG. 2 as an example, a leader pin 20 which is a leader member is attached to a distal end of the magnetic tape T. The leader pin 20 is formed in a columnar shape, and has flange portions 20A provided at both ends in the longitudinal direction protruding vertically from the end portions of the magnetic tape T in a width direction. The magnetic tape T is pulled out from the case 14 by hooking the flange portion 20A on a pull-out member (not shown) of the magnetic tape drive 70 (see FIG. 8).

In the case 14, the upper case 22 and the lower case 24 are bonded to each other. In the upper case 22, a frame-shaped peripheral wall 22B is erected along an outer edge of the top plate 22A having a rectangular shape in a plan view, and in the lower case 24, a peripheral wall 24B is erected along an outer edge of a bottom plate 24A having a shape corresponding to the top plate 22A. Then, the case 14 is formed in a box shape by bonding the upper case 22 and the lower case 24 to each other by ultrasound welding in a state in which an opening end of the peripheral wall 22B and an opening end of the peripheral wall 24B abut against each other. It should be noted that, although ultrasound welding has been described here as the method of bonding the upper case 22 and the lower case 24 to each other, the technology of the present disclosure is not limited to this. For example, the method of bonding the upper case 22 and the lower case 24 to each other may be mechanical bonding, such as screwing.

The opening 16 is formed in a rectangular shape in a side view, and is open to the right at a front end of the right side wall 14A (that is, a right-facing wall of the case 14 configured by the peripheral wall 22B and the peripheral wall 24B) along the direction of the arrow A in the case 14. The top plate 22A and the bottom plate 24A are each provided with a pin reception recess portion 26 that accommodates the flange portion 20A of the upright leader pin 20. Each pin reception recess portion 26 is also open to the right in the vicinity of the front end of the opening 16 to allow the leader pin 20 to enter and exit the case 14 through the opening 16.

In addition, a leaf spring 28 is attached to the vicinity of the front end of the case 14, and a pair of upper and lower arms 28A are provided on the leaf spring 28. In the leaf spring 28, a distal end of each arm 28A is engaged with the flange portion 20A of the leader pin 20 to hold the leader pin 20 with respect to the case 14. This holding state is released by pulling the leader pin 20 to the right with a force equal to or greater than a predetermined value.

The door 18 is formed in a substantially rectangular flat plate shape that can block the opening 16. Upper and lower end portions of the door 18 are inserted in a slidingly movable manner into guide grooves 30 provided in the top plate 22A and the bottom plate 24A along an opening surface of the opening 16 and the right side wall 14A.

As a result, the door 18 slides in a front-rear direction while being guided by the guide groove 30 to move between a block position at which the opening 16 is blocked and an opening position at which the opening 16 is open. In the example shown in FIG. 2, the door 18 is biased forward by a coil spring 32 which is a biasing member provided in the case 14. The door 18 is positioned at the block position by a biasing force. An operation unit 18A is provided at the front end of the door 18 to protrude to the right, and the door 18 moves to the opening position against the biasing force of the coil spring 32 by pressing the operation unit 18A rearward.

In addition, a gear opening 34 for exposing a reel gear 49 (see FIG. 3) described later of the cartridge reel 10 is provided in a central portion of the bottom plate 24A of the case 14. The cartridge reel 10 is rotationally driven in the case 14 by rotating a rotation shaft 60 (see FIG. 7) of the magnetic tape drive 70 (see FIG. 8) meshed with the reel gear 49.

Further, the case 14 comprises a guidance regulation wall 36. The guidance regulation wall 36 is formed along a circumference coaxial with the gear opening 34. The guidance regulation wall 36 is partially erected from the top plate 22A and the bottom plate 24A. The guidance regulation wall 36 suppresses shaking of the cartridge reel 10. In addition, the guidance regulation wall 36 has end portions continuous with the peripheral walls 22B and 24B to prevent dust and the like from entering an installation region of the cartridge reel 10.

A cartridge memory M is provided in the lower case 24. Specifically, the cartridge memory M is accommodated in a right rear end portion of the lower case 24. An IC chip having an NVM is mounted on the cartridge memory M. In the present embodiment, a so-called passive RFID tag is adopted as the cartridge memory M, and the read/write of various pieces of information is performed with respect to the cartridge memory M in a noncontact manner.

The cartridge memory M stores management information for managing the magnetic tape cartridge 12. Examples of the management information include information on the cartridge memory M (for example, information for specifying the magnetic tape cartridge 12), information on the magnetic tape T (for example, information indicating a recording capacity of the magnetic tape T, information indicating an outline of the data recorded in the magnetic tape T, information indicating items of the data recorded in the magnetic tape T, and information indicating a recording format of the data recorded in the magnetic tape T), and information on the magnetic tape drive 70 (see FIG. 8) (for example, information indicating a specification of the magnetic tape drive 70 and a signal used in the magnetic tape drive).

Figure 3:
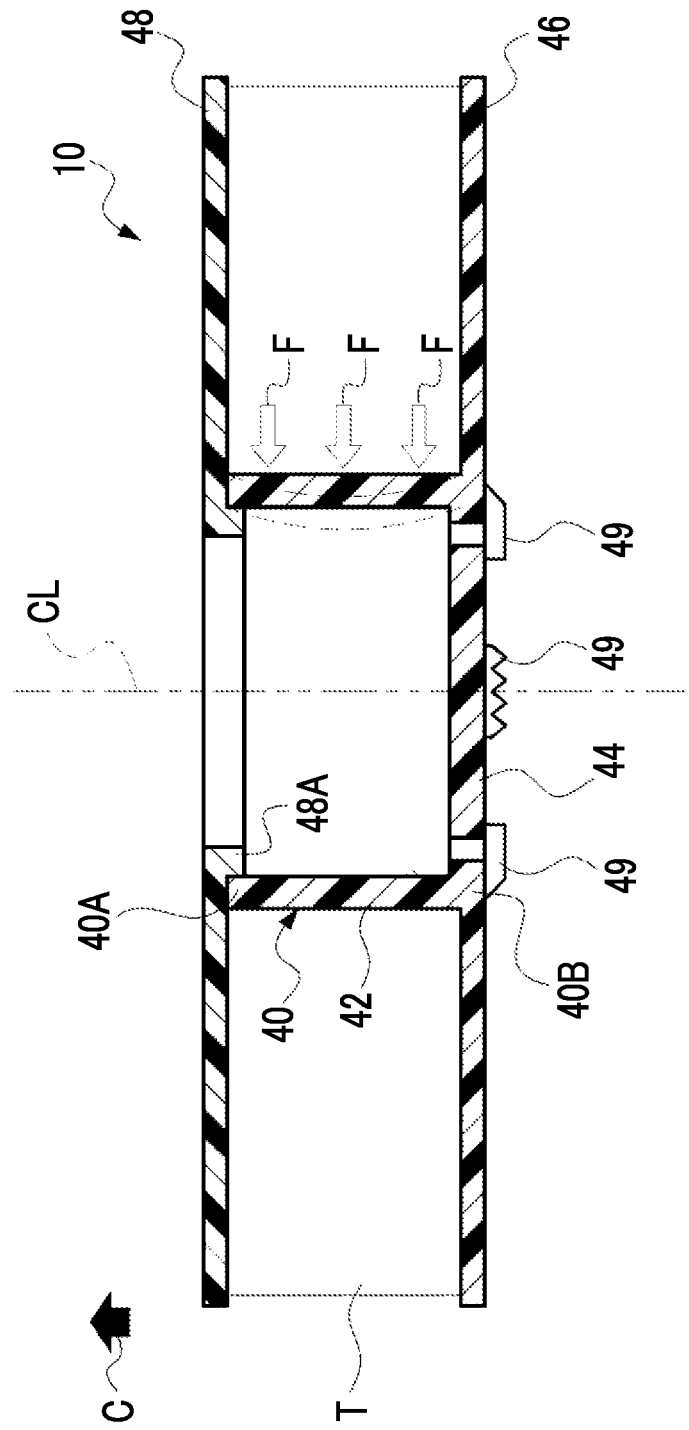
FIG. 3 is a cross-sectional view showing an example of a schematic configuration of a cartridge reel known in the related art as a comparative example.

As an example, as shown in FIG. 3, the cartridge reel 10 comprises a hub 40, an upper flange 48, and a lower flange 46. The hub 40 has a cylindrical shape, and the magnetic tape T is wound around an outer peripheral surface of the hub 40. The hub 40 includes a cylindrical portion 42 and a bottom surface portion 44 formed at a lower end of the cylindrical portion 42. In the present embodiment, the hub 40 is an example of a "hub" according to the technology of the present disclosure.

The upper flange 48 has an annular shape that protrudes from an upper end side of the hub 40 along a radial direction of a central axis of the hub 40. The upper flange 48 is formed as a separate component from the hub 40. The upper flange 48 is attached to an upper end portion 40A of the hub 40. In the example shown in FIG. 3, the upper flange 48 is attached to the hub 40 by inserting a protruding portion 48A provided at an opening edge of the upper flange 48 on a central axis CL side into the inner peripheral side of the hub 40.

The lower flange 46 has an annular shape that protrudes from a lower end side of the hub 40 along the radial direction of the hub 40 (that is, a direction orthogonal to the central axis CL). The lower flange 46 is formed integrally with the hub 40.

The magnetic tape T is wound around the cylindrical portion 42 of the hub 40. A bending load F is generated from the magnetic tape T on the cylindrical portion 42 by being fastened by the magnetic tape T. The upper flange 48 and the lower flange 46 are provided on the upper end portion 40A and a lower end portion 40B of the hub 40, respectively. As a result, the upper end portion 40A and the lower end portion 40B of the hub 40 have higher rigidity (for example, bending rigidity) than the central portion of the hub 40 in an up-down direction. The reason is that the upper flange 48 and the lower flange 46 that are continuous in a circumferential direction function as support members for the hub 40 and contribute to the improvement of the rigidity.

As a result, in a case in which the cylindrical portion 42 is deformed by being fastened by the magnetic tape T, a deformation amount is non-uniform in a direction along the central axis CL of the hub 40 (hereinafter, also simply referred to as an "axial direction"). Therefore, a stress distribution in the width direction in the magnetic tape T wound around the cylindrical portion 42 is also non-uniform. In a state in which the magnetic tape T is wound around the cartridge reel 10 and stored in a long term, the deformation (for example, creep deformation) due to the stress generated in the magnetic tape T occurs. Therefore, in a case in which the stress distribution in the width direction of the magnetic tape T is non-uniform, the deformation of the width of the magnetic tape T due to the stress distribution is also non-uniform. That is, in the magnetic tape T, the width on the core side is wider than the width before storage, and the outer width is narrower than the outer width before storage. The non-uniform deformation of the width in the magnetic tape T makes it difficult to accurately position the position of the magnetic head with respect to the magnetic tape T. As a result, a recording defect or a reading defect of data in the magnetic tape T occurs. This problem is further pronounced as a data track width is narrower as the recording density of the magnetic tape T is increased.

Figure 4:
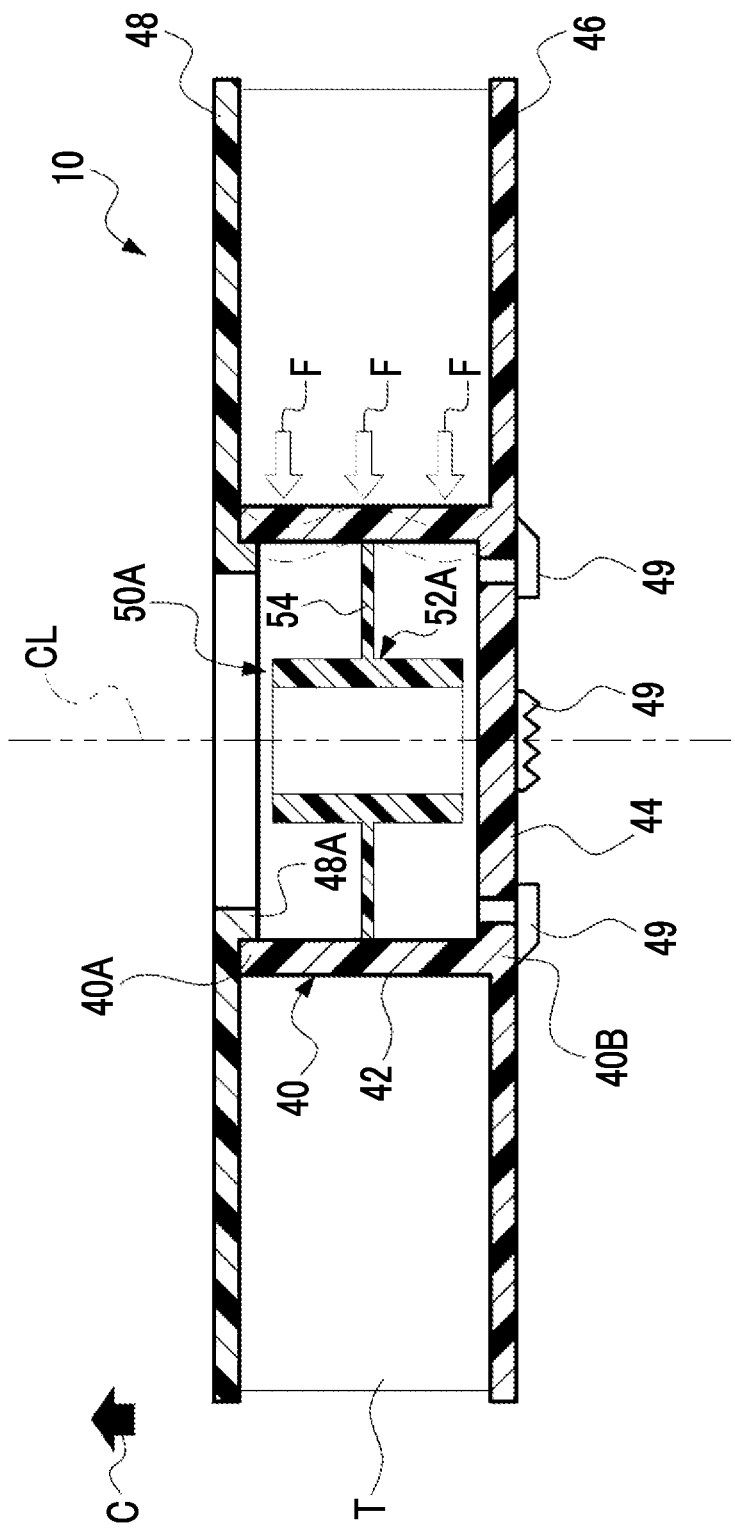
FIG. 4 is a cross-sectional view showing an example of the schematic configuration of the cartridge reel known in the related art as the comparative example.

In addition, as a comparative example, a case is considered in which only one rib 54 is formed in a central region 52A in a reinforcing member 50A known in the related art as shown in FIG. 4. In this case, a compressive force from the hub 40 is supported at only one place in the central region 52A. Therefore, the deformation occurs on the upper end portion 40A side and the lower end portion 40B side. As a result, in a case in which the magnetic tape T is wound around the cylindrical portion 42, the stress distribution in the width direction in the magnetic tape T is non-uniform due to a difference in deformation amount between the central portion in the up-down direction of the hub 40 and the upper end portion 40A side and the lower end portion 40B side. That is, similarly to a case in which the reinforcing member 50A is not provided on an inner peripheral side of the cylindrical portion 42 of the hub 40 (see FIG. 3), there arises a problem that the stress distribution in the width direction in the magnetic tape T is non-uniform.

Figure 5:
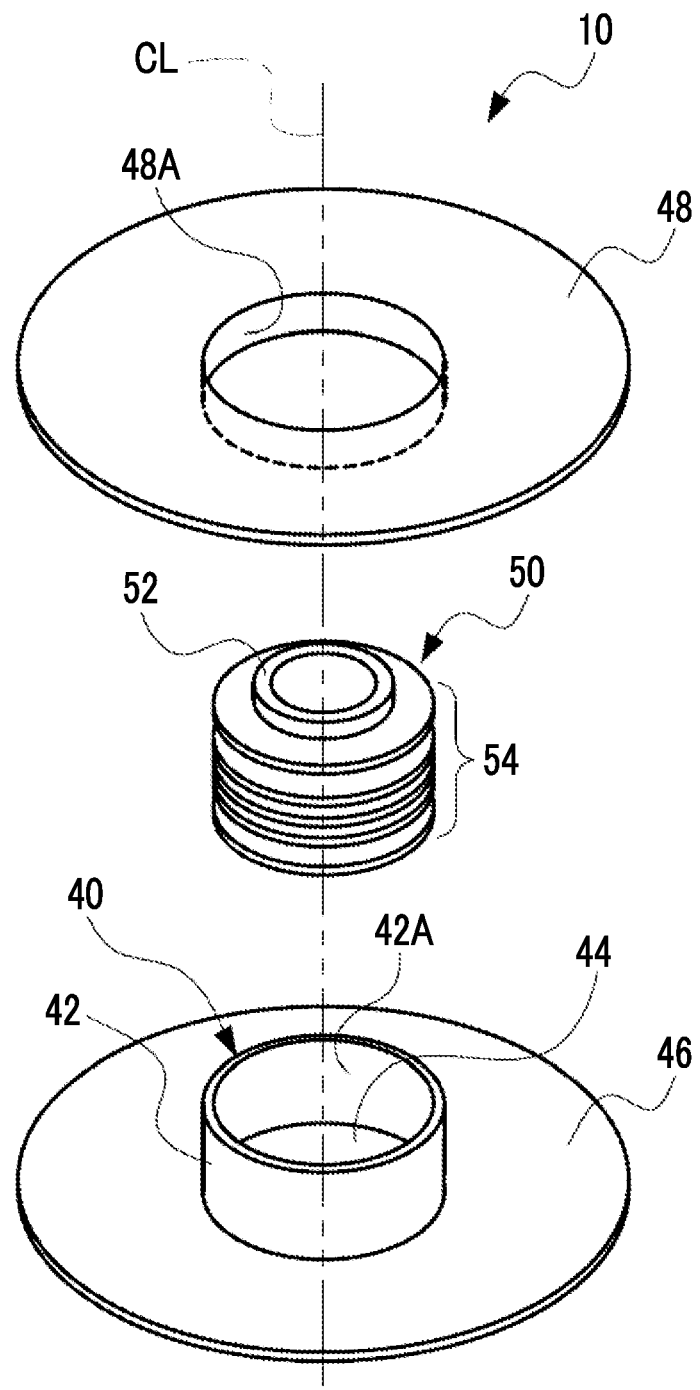
FIG. 5 is an exploded perspective view showing an example of a schematic configuration of a cartridge reel according to the present embodiment.

Therefore, as shown in FIG. 5 as an example, the cartridge reel 10 according to the present embodiment is provided with a reinforcing member 50. The reinforcing member 50 is provided on the inner peripheral side of the hub 40. The reinforcing member 50 comprises a shaft member 52 and a plurality of ribs 54. In the present embodiment, the reinforcing member 50 is an example of a "reinforcing member" according to the technology of the present disclosure, the plurality of ribs 54 are an example of a "plurality of ribs" according to the technology of the present disclosure, and the shaft member 52 is an example of a "shaft member" according to the technology of the present disclosure.

Examples of the material of the reinforcing member 50 include a polyphenylene sulfide resin that contains glass fibers in a volume content of about 40%. The reinforcing member 50 is molded, for example, by injection mold. That is, the shaft member 52 and the plurality of ribs 54 are integrally molded.

The shaft member 52 is a rod-like member. A longitudinal direction of the shaft member 52 is along the central axis CL of the hub 40. It should be noted that, in the example shown in FIG. 5, a hollow columnar rod-like member is shown as the shaft member 52.

The plurality of ribs 54 are provided along the longitudinal direction of the shaft member 52. The plurality of ribs 54 have an annular shape that extends from an outer peripheral surface of the shaft member 52 toward an inner peripheral surface 42A of the cylindrical portion 42 of the hub 40 in a state in which the plurality of ribs 54 are provided on the inner peripheral side of the cylindrical portion 42. Also, the plurality of ribs 54 have a continuous annular shape. In the example shown in FIG. 5, an example is shown in which five ribs 54 are provided.

Figure 6:
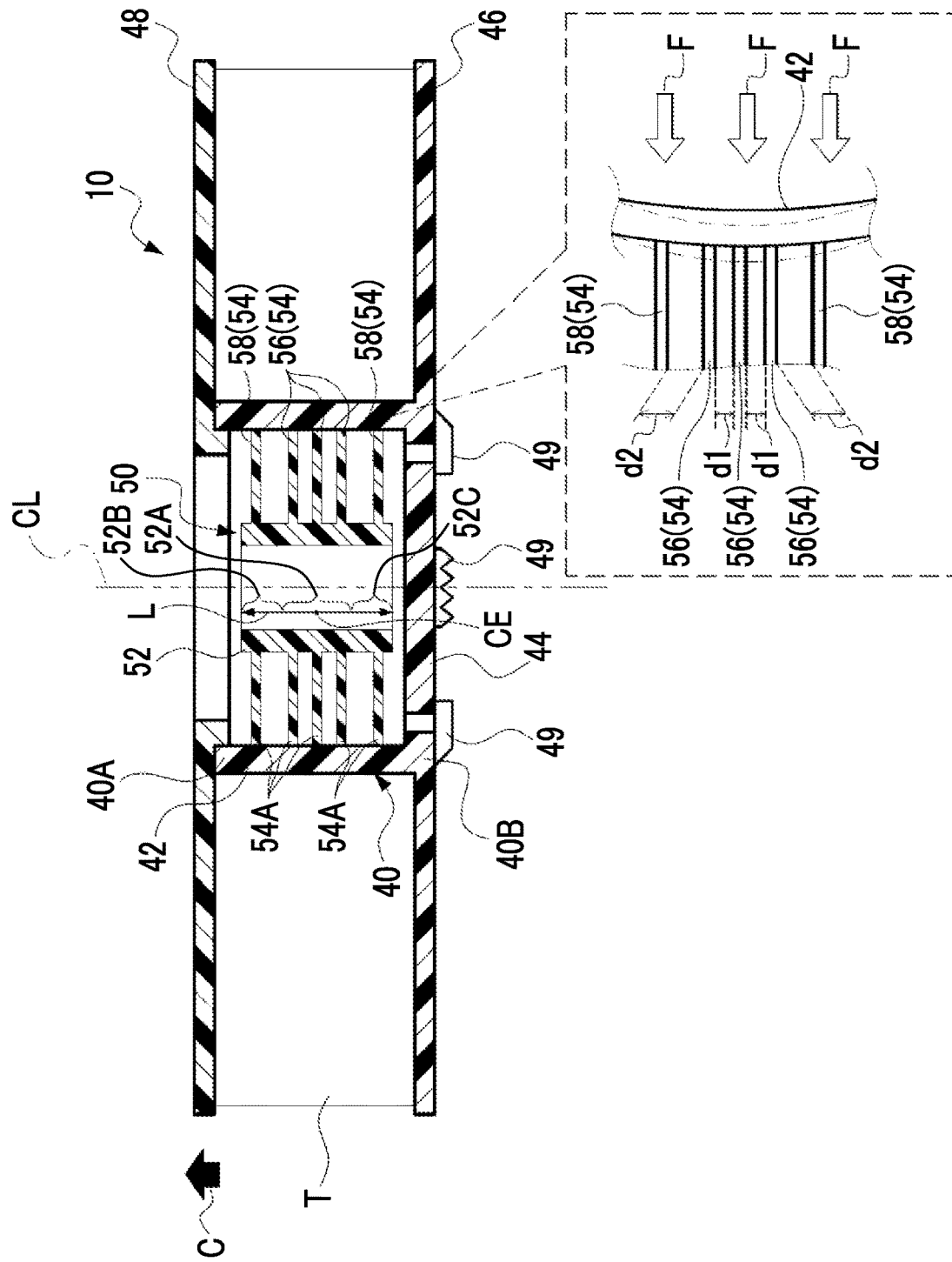
FIG. 6 is a cross-sectional view showing an example of the schematic configuration of the cartridge reel according to the present embodiment.

As shown in FIG. 6 as an example, in the plurality of ribs 54, an outer edge portion 54A abuts against the inner peripheral surface 42A of the cylindrical portion 42 of the hub 40. The reinforcing member 50 is, for example, press-fitted into the inner peripheral side of the cylindrical portion 42. As a result, the outer edge portions 54A of the plurality of ribs 54 abut against the inner peripheral surface 42A. In a case of press-fitting, a length of the plurality of ribs 54 (that is, a distance from the outer peripheral surface of the shaft member 52 along the radial direction of the shaft member 52) may be a distance longer than a distance from the outer peripheral surface of the shaft member 52 to the inner peripheral surface 42A of the hub 40, by 0.1 to 0.2 mm. As a result, the outer edge portions 54A of the plurality of ribs 54 are likely to abut against the inner peripheral surface 42A of the hub 40.

The plurality of ribs 54 include a first rib 56 in the central region 52A in the longitudinal direction of the shaft member 52. Here, in a case in which the length of the longitudinal direction of the shaft member 52 is L, the central region 52A refers to a range of −0.25 L to 0.25 L from a middle point CE in the longitudinal direction of the shaft member 52. A plurality of the first ribs 56 are provided. In the example shown in FIG. 6, three first ribs 56 are provided in the central region 52A, but this is merely an example. The number of the first ribs 56 may be two or may be four or more. In the present embodiment, the first rib 56 is an example of a "first rib" according to the technology of the present disclosure.

In addition, the plurality of ribs 54 include a second rib 58 provided in a region other than the central region 52A in the longitudinal direction of the shaft member 52. In the present embodiment, the second rib 58 is an example of a "second rib" according to the technology of the present disclosure. Specifically, the second rib 58 is provided in each of an upper end side region 52B and a lower end side region 52C in the longitudinal direction.

Axial rigidity of the first rib 56 is set higher than axial rigidity of the second rib 58. As shown in FIG. 6 in an enlarged manner, the three first ribs 56 are provided in the central region 52A. On the other hand, one second rib 58 is provided in each of the upper end side region 52B and the lower end side region 52C. As a result, the axial rigidity of the first rib 56 is higher than the axial rigidity of the second rib 58. Stated another way, the first rib 56 is less likely to be deformed than the second rib 58 with respect to the compressive force received from the cylindrical portion 42 of the hub 40 by the first rib 56 and the second rib 58.

Further, an interval d1 between the plurality of first ribs 56 is narrower than an interval d2 between the second rib 58 and the first rib 56. Stated another way, in the plurality of ribs 54, the interval between the adjacent ribs 54 is denser in the central region 52A than in the upper end side region 52B and the lower end side region 52C. As a result, the axial rigidity of the first rib 56 is further higher than the axial rigidity of the second rib 58.

Figure 7:
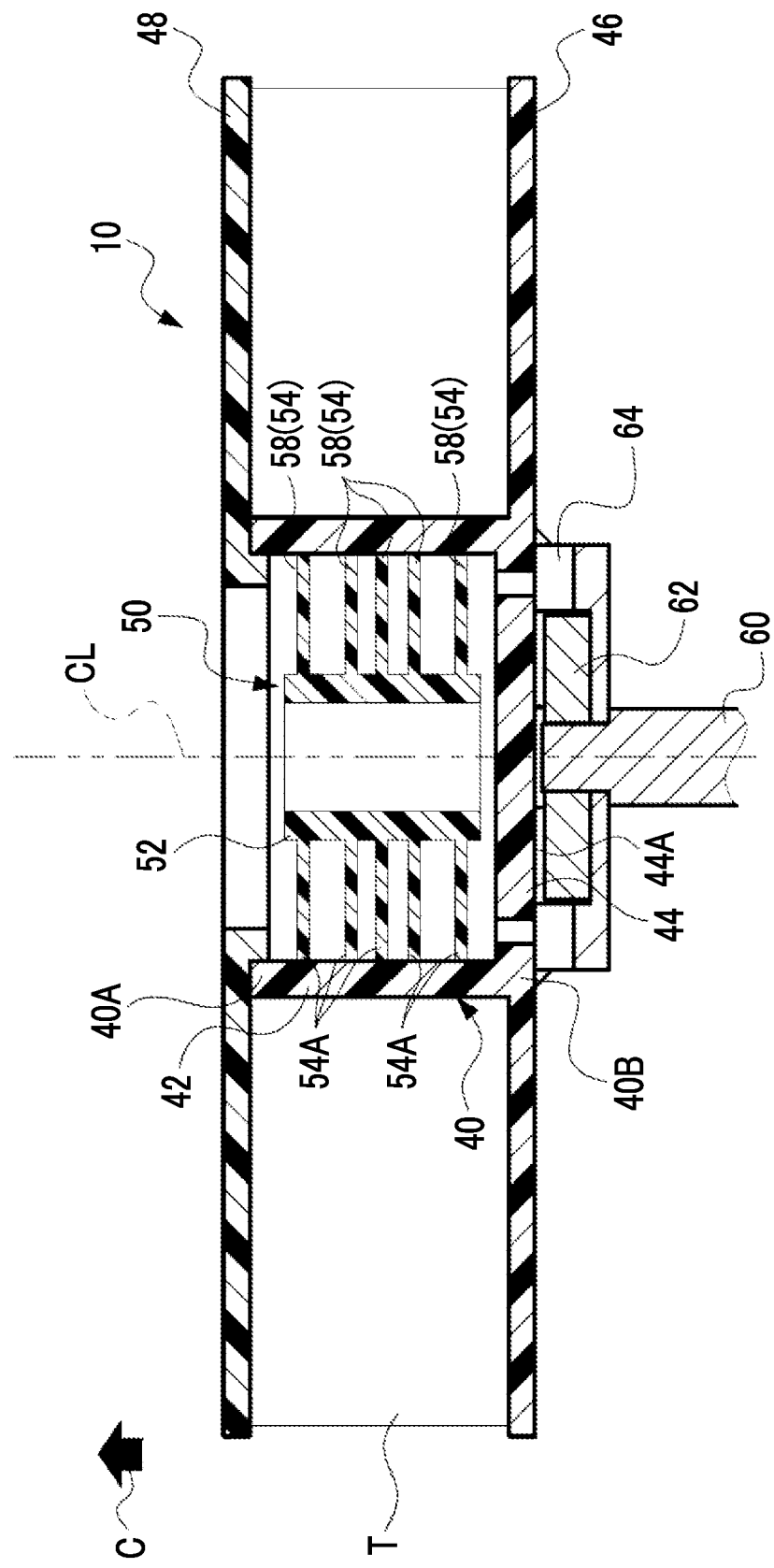
FIG. 7 is a cross-sectional view showing an example of the schematic configuration of the cartridge reel according to the present embodiment.

As shown in FIG. 7 as an example, the bottom surface portion 44 of the hub 40 is provided with a support surface 44A. The rotation shaft 60 that rotates the cartridge reel 10 is attached to the support surface 44A. In the present embodiment, the bottom surface portion 44 is an example of a "bottom portion" according to the technology of the present disclosure, the support surface 44A is an example of a "support surface" according to the technology of the present disclosure, and the rotation shaft 60 is an example of a "rotation shaft" according to the technology of the present disclosure. The rotation shaft 60 is provided in the magnetic tape drive 70 (see FIG. 8) and rotates by receiving a drive force from a sending motor 86 (see FIG. 8). For example, the rotation shaft 60 is attached to the bottom surface portion 44 by a magnetic action. Specifically, the rotation shaft 60 is attached to the support surface 44A via a magnet 62. The rotation shaft 60 further comprises a rotation shaft gear 64. The rotation shaft gear 64 is meshed with the reel gear 49 to transmit the drive force of the rotation shaft 60 to the cartridge reel 10.

In this way, in the cartridge reel 10 according to the present embodiment, the reinforcing member 50 is provided on the inner peripheral side of the hub 40 around which the magnetic tape T is wound. The reinforcing member 50 has the plurality of annular ribs 54 along the longitudinal direction of the shaft member 52. The plurality of ribs 54 include the first rib 56 provided in the central region 52A in the longitudinal direction of the shaft member 52. The center of the hub 40 in the central axis direction has lower bending rigidity than the upper end portion and the lower end portion of the hub 40 in the central axis direction. The reason is that the upper end portion and the lower end portion of the hub 40 are supported by other members (for example, the upper flange 48 and the lower flange 46). Therefore, the bending rigidity at the center in the central axis direction is improved in the hub 40 by supporting the inner peripheral surface 42A of the hub 40 by the first rib 56. This configuration contributes to uniformization of bending rigidity in the central axis direction in the hub 40. As a result, this configuration contributes to uniformization of the stress distribution in the width direction generated in the magnetic tape T in a state in which the magnetic tape T is wound around the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced. For example, as compared with a case in which the reinforcing member 50 is not provided on the inner peripheral side of the hub 40, the bending rigidity distribution in the central axis direction is uniformized in the hub 40, so that the stress distribution that occurs in the magnetic tape T wound around the hub 40 is also uniformized. As a result, the non-uniform deformation (for example, the non-uniform creep deformation) of the width of the magnetic tape T due to the non-uniform stress distribution in the magnetic tape T is reduced.

In addition, in the cartridge reel 10 according to the present embodiment, the plurality of ribs 54 include the second rib 58 provided in the region other than the central region 52A. As a result, since the bending rigidity is improved in the region other than the central region 52A in the hub 40, this configuration contributes to uniformization of the bending rigidity in the hub 40 in the central axis direction. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the cartridge reel 10 according to the present embodiment, the second rib 58 is provided in each of the upper end side region 52B and the lower end side region 52C. As a result, since the bending rigidity is also improved in the upper end side region 52B and the lower end side region 52C, this configuration contributes to uniformization of the bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the cartridge reel 10 according to the present embodiment, the axial rigidity of the first rib 56 is set to be higher than the axial rigidity of the second rib 58. In the hub 40, the bending rigidity is decreased toward the center in the central axis direction. Also, an axial force in a compression direction (that is, a force in the radial direction with respect to the rib 54) is generated in the rib 54 that supports the hub 40 due to bending deformation of the hub 40. Therefore, since the first rib 56 of the central region 52A of the reinforcing member 50 is set to have higher axial rigidity than the second rib 58, this configuration contributes to uniformization of the bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the cartridge reel 10 according to the present embodiment, the axial rigidity of the central region 52A of the reinforcing member 50 is improved by providing the plurality of first ribs 56. This configuration contributes to uniformization of bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the cartridge reel 10 according to the present embodiment, the interval between the first ribs 56 is narrower than the interval between the second rib 58 and the first rib 56. As a result, the axial rigidity of the central region 52A of the reinforcing member 50 is set to be higher than the axial rigidity in the region other than the central region 52A. This configuration contributes to uniformization of bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the cartridge reel 10 according to the present embodiment, the outer edge portions 54A of the plurality of ribs 54 abut against the inner peripheral surface 42A of the hub 40. As a result, the rib 54 of the reinforcing member 50 supports the hub 40 from an initial stage of the deformation. This configuration contributes to uniformization of bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the cartridge reel 10 according to the present embodiment, the plurality of ribs 54 have a continuous annular shape. As a result, the rib 54 of the reinforcing member 50 supports the hub 40 in the circumferential direction of the inner peripheral surface 42A of the hub 40. This configuration contributes to uniformization of bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the cartridge reel 10 according to the present embodiment, the reinforcing member 50 is press-fitted into the hub 40. As a result, the rib 54 of the reinforcing member 50 supports the hub 40 from the initial stage of the deformation. This configuration contributes to uniformization of bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the cartridge reel 10 according to the present embodiment, the support surface 44A to which the rotation shaft 60 that rotates the cartridge reel 10 is attached is provided on the bottom surface portion 44 of the hub 40. By providing the support surface 44A, the bending rigidity of the hub 40 in the vicinity of the support surface 44A is locally increased in the hub 40. Therefore, in the hub 40, the bending rigidity in the central axis direction is non-uniformized. In the present embodiment, since the reinforcing member 50 is provided, this configuration contributes to uniformization of bending rigidity of the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the magnetic tape cartridge 12 according to the present embodiment, the cartridge reel 10 comprising the reinforcing member 50 is provided, and further the cartridge reel 10 is accommodated in the case 14. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

Second Embodiment

In the first embodiment described above, the form example has been described in which the cartridge reel 10 is accommodated in the case 14 of the magnetic tape cartridge 12 and used, but the technology of the present disclosure is not limited to this. In the second embodiment, a case will be described in which the same configuration as the configuration of the cartridge reel 10 is applied to a machine reel 88 provided in the magnetic tape drive 70. In the present embodiment, the magnetic tape drive 70 is an example of a "magnetic tape drive" according to the technology of the present disclosure.

Figure 8:
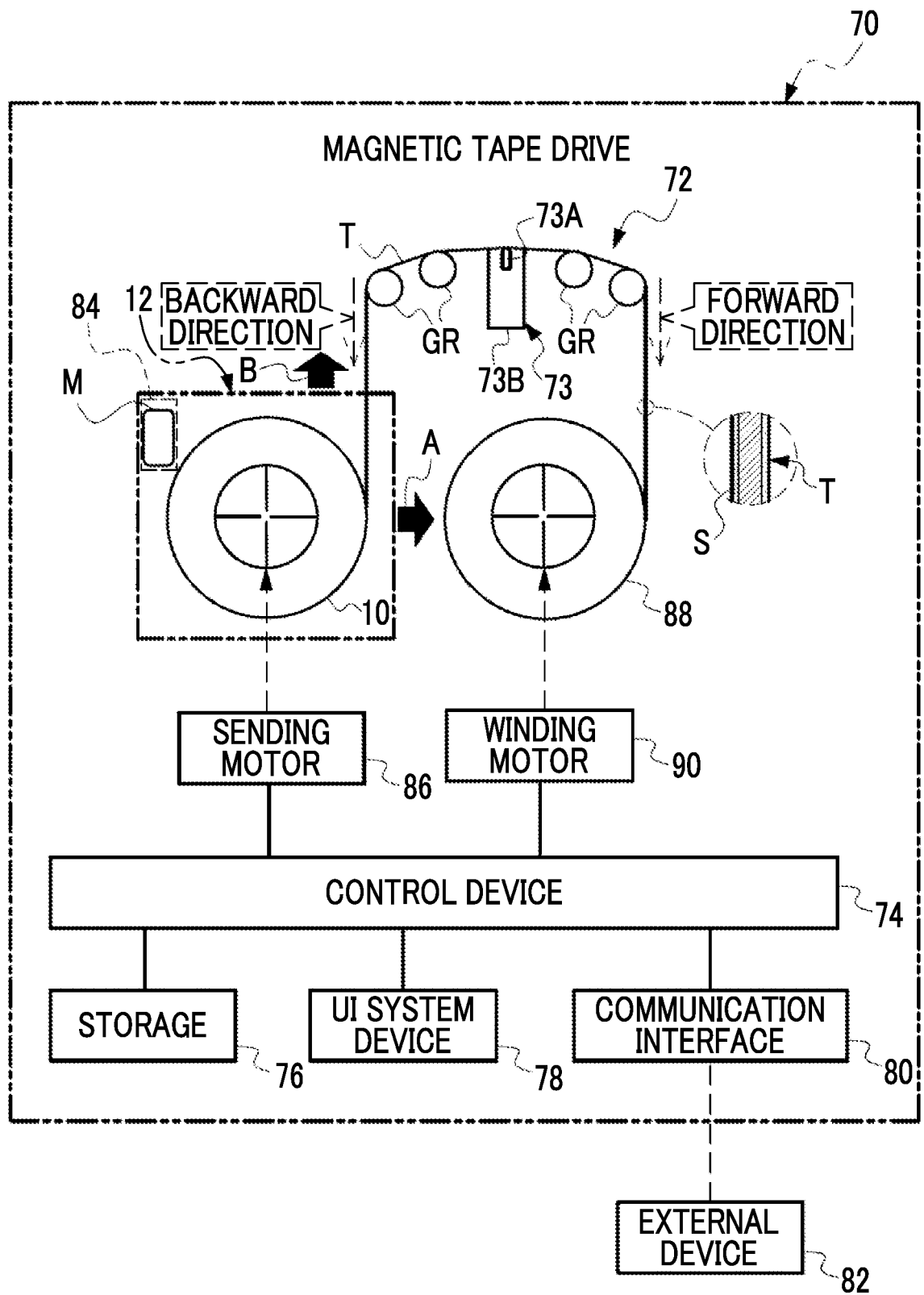
FIG. 8 is a conceptual view showing an example of a hardware configuration of a magnetic tape drive according to the present embodiment.

As an example, as shown in FIG. 8, the magnetic tape drive 70 comprises a transport device 72, a magnetic head 73, a control device 74, a storage 76, a UI system device 78, and a communication interface 80. The magnetic tape drive 70 is loaded into the magnetic tape cartridge 12 along the direction of the arrow A. In the magnetic tape drive 70, the magnetic tape T is pulled out from the magnetic tape cartridge 12 and used.

The magnetic tape drive 70 pulls out the magnetic tape T from the magnetic tape cartridge 12, records the data in a front surface S of the pulled out magnetic tape T by using the magnetic head 73, or reads the data from the front surface S of the pulled out magnetic tape T by using the magnetic head 73.

The control device 74 controls the entire magnetic tape drive 70. In the present embodiment, although the control device 74 is realized by an ASIC, the technology of the present disclosure is not limited to this. For example, the control device 74 may be realized by an FPGA and/or a PLC. In addition, the control device 74 may be realized by the computer including a CPU, a flash memory (for example, an EEPROM and/or an SSD), and a RAM.

The storage 76 is connected to the control device 74, and the control device 74 writes various pieces of information to the storage 76 and reads out various pieces of information from the storage 76. Examples of the storage 76 include a flash memory and/or an HDD.

The UI system device 78 is a device having the reception function of receiving a command signal indicating a command from a user and the presentation function of presenting the information to the user. The reception function is realized by a touch panel, a hard key (for example, a keyboard), and/or a mouse, for example. The presentation function is realized by a display, a printer, and/or a speaker, for example. The UI system device 78 is connected to the control device 74. The control device 74 acquires the command signal received by the UI system device 78. The UI system device 78 presents various pieces of information to the user under the control of the control device 74.

The communication interface 80 is connected to the control device 74. In addition, the communication interface 80 is connected to an external device 82 via a communication network (not shown), such as a WAN and/or a LAN. The communication interface 80 controls the exchange of various pieces of information (for example, the data to be recorded in the magnetic tape T, the data read from the magnetic tape T, and/or a command signal given to the control device 74) between the control device 74 and the external device 82. It should be noted that examples of the external device 82 include a personal computer and a mainframe.

The magnetic head 73 comprises a magnetic element unit 73A and a holder 73B. The magnetic element unit 73A is held by the holder 73B to come into contact with the traveling magnetic tape T. The magnetic element unit 73A includes a plurality of magnetic elements. In the present embodiment, the magnetic head 73 is an example of a "magnetic head" according to the technology of the present disclosure.

The magnetic element unit 73A records the data in the magnetic tape T transported by the transport device 72, and reads the data from the magnetic tape T transported by the transport device 72.

The magnetic tape drive 70 comprises a noncontact read/write device 84. The noncontact read/write device 84 is disposed to face the cartridge memory M on the lower side of the magnetic tape cartridge 12 in a state in which the magnetic tape cartridge 12 is loaded, and performs the read/write of the information with respect to the cartridge memory M in a noncontact manner.

The transport device 72 is a device that selectively transports the magnetic tape T along a predetermined path in a forward direction and a backward direction, and comprises a sending motor 86, a machine reel 88, a winding motor 90, and a plurality of guide rollers GR. It should be noted that, here, the forward direction refers to a sending direction of the magnetic tape T, and the backward direction refers to a rewinding direction of the magnetic tape T. In the present embodiment, the transport device 72 is an example of a "travel mechanism" according to the technology of the present disclosure.

The sending motor 86 rotates the cartridge reel 10 in the magnetic tape cartridge 12 under the control of the control device 74. The control device 74 controls the sending motor 86 to control a rotation direction, a rotation speed, a rotation torque, and the like of the cartridge reel 10.

The winding motor 90 rotates the machine reel 88 under the control of the control device 74. The control device 74 controls the winding motor 90 to control a rotation direction, a rotation speed, a rotation torque, and the like of the machine reel 88.

In a case in which the magnetic tape T is wound by the machine reel 88, the control device 74 rotates the sending motor 86 and the winding motor 90 such that the magnetic tape T travels along the predetermined path in the forward direction. The rotation speed, the rotation torque, and the like of the sending motor 86 and the winding motor 90 are adjusted in accordance with a speed at which the magnetic tape T is wound around the machine reel 88. In addition, by adjusting the rotation speed, the rotation torque, and the like of each of the sending motor 86 and the winding motor 90 by the control device 74, the tension is applied to the magnetic tape T. In addition, the tension applied to the magnetic tape T is controlled by adjusting the rotation speed, the rotation torque, and the like of each of the sending motor 86 and the winding motor 90 by the control device 74.

It should be noted that, in a case in which the magnetic tape T is rewound to the cartridge reel 10, the control device 74 rotates the sending motor 86 and the winding motor 90 such that the magnetic tape T travels along the predetermined path in the backward direction.

Each of the plurality of guide rollers GR is a roller which guides the magnetic tape T. The predetermined path, that is, a traveling path of the magnetic tape T is determined by separately disposing the plurality of guide rollers GR at positions straddling the magnetic head 73 between the magnetic tape cartridge 12 and the machine reel 88.

As an example, as shown in FIG. 9, the machine reel 88 comprises the hub 40, the upper flange 48, and the lower flange 46. The hub 40 has a cylindrical shape, and the magnetic tape T is wound around an outer peripheral surface of the hub 40. The hub 40 includes a cylindrical portion 42 and a bottom surface portion 44 formed at a lower end of the cylindrical portion 42. The reinforcing member 50 is provided on the inner peripheral side of the hub 40. The reinforcing member 50 is provided with the plurality of ribs 54.

The bottom surface portion 44 has the support surface 44A. The rotation shaft 60 that rotates the cartridge reel 10 is fixed to the support surface 44A. For example, the rotation shaft 60 is fixed to the bottom surface portion 44 by a fastening member 66 (for example, a screw) in a state in which one end of the rotation shaft 60 is inserted into a fitting portion 44B provided on the support surface 44A. The rotation shaft 60 transmits the drive force to the cartridge reel 10.

In this way, in the machine reel 88 according to the present embodiment, the support surface 44A to which the rotation shaft 60 that rotates the machine reel 88 is fixed is provided on the bottom surface portion 44 of the hub 40. By providing the support surface 44A, the bending rigidity of the hub 40 in the vicinity of the support surface 44A is locally increased in the hub 40. Therefore, in the hub 40, the bending rigidity in the central axis direction is non-uniformized. In the present embodiment, since the reinforcing member 50 is provided, this configuration contributes to uniformization of bending rigidity of the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

In addition, in the magnetic tape drive 70 according to the present embodiment, the machine reel 88 comprising the reinforcing member 50 is provided. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

Also, in the second embodiment described above, the magnetic tape drive 70 in which the magnetic tape cartridge 12 is loaded has been illustrated, but the technology of the present disclosure is not limited to this. For example, the magnetic tape drive 70 may be the magnetic tape drive 70 in which the magnetic tape T in a state of not being accommodated in the magnetic tape cartridge 12 is wound around a sending reel, that is, the magnetic tape drive 70 in which the magnetic tape T is installed in a not interchangeable manner. In this case, the same configuration as the configuration of the machine reel 88 can be applied to the sending reel.

First Modification Example

In each of the embodiments described above, the form example has been described in which the reinforcing member 50 is press-fitted into the hub 40, but the technology of the present disclosure is not limited to this. In the first modification example, the reinforcing member 50 is bonded to the hub 40. After the reinforcing member 50 is inserted into the hub 40, for example, the outer edge portions 54A of the plurality of ribs 54 and the inner peripheral surface 42A of the hub 40 are welded by ultrasound welding, whereby the reinforcing member 50 and the hub 40 are bonded to each other. It should be noted that, although ultrasound welding has been described here as the bonding method, this is merely an example. As the bonding method, pressure bonding, brazing, heat welding, or mechanical bonding (for example, screwing) may be adopted.

In this way, in the cartridge reel 10 according to the present embodiment, the reinforcing member 50 is bonded to the hub 40. As a result, the rib 54 of the reinforcing member 50 supports the hub 40 from the initial stage of the deformation. This configuration contributes to uniformization of bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

Second Modification Example

In each of the embodiments described above, the form example has been described in which the inner peripheral surface 42A of the hub 40 is a surface along the central axis direction of the hub 40, but the technology of the present disclosure is not limited to this. In the second modification example, the cylindrical portion 42 of the hub 40 is provided with a taper.

As an example, as shown in FIG. 10, a thickness of the cylindrical portion 42 of the hub 40 in the radial direction is decreased toward the upper end portion of the cylindrical portion 42. That is, the inner peripheral surface 42A of the cylindrical portion 42 of the hub 40 is an inclination surface with respect to the central axis direction of the hub 40. An angle α of the inclination surface of the inner peripheral surface 42A (that is, an angle of the inclination surface with respect to the central axis CL) is, for example, 0.5 to 1 degree. In the example shown in FIG. 10, the angle α is exaggerated in order to make it easier to visually grasp the angle α.

The length of the rib 54 of the reinforcing member 50 (that is, the distance from the outer peripheral surface of the shaft member 52 along the radial direction of the shaft member 52) is a length corresponding to the angle α of the taper of the hub 40. In the example shown in FIG. 10, the length of the rib 54 is set to be longer toward an opening side (that is, the upper end portion 40A side). In addition, the outer edge portion 54A of the rib 54 is the inclination surface having an angle corresponding to the angle α of the taper of the hub 40.

The reinforcing member 50 is press-fitted into the hub 40 (see an arrow D in FIG. 10). In this case, the reinforcing member 50 is press-fitted while being positioned by the taper provided on the hub 40. That is, an inner diameter of the cylindrical portion 42 of the hub 40 is wider on the opening side (that is, on the upper end portion 40A side) than on the lower end portion 40B side. For this reason, the reinforcing member 50 is likely to be inserted into the hub 40 at the start of press-fitting the reinforcing member 50, and the reinforcing member 50 is positioned at a predetermined position in the hub 40 at the completion of press-fitting.

Further, in the reinforcing member 50, the axial rigidity of the plurality of ribs 54 may be changed in accordance with the taper provided in the hub 40. That is, the thickness of the cylindrical portion 42 of the hub 40 in the radial direction is decreased toward the upper end portion 40A of the hub 40. Therefore, the bending rigidity of the hub 40 is decreased toward the upper end portion 40A of the hub 40. The axial rigidity of the rib 54 of the reinforcing member 50 may be set to be higher toward a position corresponding to the upper end portion 40A of the hub 40. For example, the thickness of the rib 54 of the reinforcing member 50 (that is, the distance along the longitudinal direction of the shaft member 52) is set to be larger toward the position corresponding to the upper end portion 40A.

In this way, the reinforcing member 50 is press-fitted into the hub 40. In addition, the cylindrical portion 42 of the hub 40 is provided with the taper. As a result, the hub 40 of the reinforcing member 50 supports the hub 40 from the initial stage of deformation. This configuration contributes to uniformization of bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

Third Modification Example

In each of the embodiments described above, the form example has been described in which the interval d1 between the first ribs 56 and the interval d2 between the second rib 58 and the first rib 56 are changed in the reinforcing member 50, but the technology of the present disclosure is not limited to this. In the third modification example, in the reinforcing member 50, the plurality of ribs 54 are disposed at equal intervals along the longitudinal direction of the shaft member 52. It should be noted that, in the present embodiment, "equal interval" refers to the equal interval in the sense of including an error generally allowed in the technical field to which the technology of the present disclosure belongs, that is the error to the extent that it does not contradict the purpose of the technology of the present disclosure, in addition to the exact equal interval.

As an example, as shown in FIG. 11, the three first ribs 56 are provided in the central region 52A. Also, one second rib 58 is provided in each of the upper end side region 52B and the lower end side region 52C. Further, the interval d1 between the plurality of first ribs 56 is set to be the equal interval to the interval d2 between the second rib 58 and the first rib 56.

In this case as well, since the plurality of ribs 54 suppress the deformation of the cylindrical portion 42 of the hub 40, the bending rigidity is improved even in the central region 52A and the region other than the central region 52A. As a result, this configuration contributes to uniformization of bending rigidity in the central axis direction in the hub 40. Therefore, with the third modification example, the non-uniform deformation (for example, the non-uniform creep deformation) of the width of the magnetic tape T due to the non-uniform stress distribution that occurs in the magnetic tape T wound around the hub 40 is reduced.

Fourth Modification Example

In each of the embodiments described above, the form example has been described in which the plurality of ribs 54 include the first rib 56 and the second rib 58, but the technology of the present disclosure is not limited to this. In the fourth modification example, the plurality of ribs 54 include only the first rib 56.

As shown in FIG. 12 as an example, in the reinforcing member 50, the plurality of ribs 54 include the three first ribs 56. The three first ribs 56 are provided in the central region 52A. The interval d1 between the three first ribs 56 is set to equal intervals.

In this case as well, since the plurality of ribs 54 support the deformation of the cylindrical portion 42 of the hub 40, the bending rigidity is improved in the central region 52A. As a result, this configuration contributes to uniformization of bending rigidity in the central axis direction in the hub 40. Therefore, with the present configuration, the non-uniform deformation (for example, the non-uniform creep deformation) of the width of the magnetic tape T due to the non-uniform stress distribution that occurs in the magnetic tape T wound around the hub 40 is reduced.

Other Modification Examples

It should be noted that, in each of the embodiments described above, the form example has been described in which the second rib 58 is provided in each of the upper end side region 52B and the lower end side region 52C, but the technology of the present disclosure is not limited to this. For example, a plurality of the second ribs 58 may be provided in each of the upper end side region 52B and the lower end side region 52C, or the second rib 58 may only be provided in any one of the upper end side region 52B or the lower end side region 52C.

In addition, in each of the embodiments described above, as the form example in which the difference in axial rigidity is provided between the first rib 56 and the second rib 58, the form example has been described in which the interval between the first ribs 56 and the interval between the second rib 58 and the first rib 56 are changed, but the technology of the present disclosure is not limited to this. For example, the first rib 56 may be made of a material having higher axial rigidity than the second rib 58 to provide the difference in the axial rigidity. In addition, the difference in axial rigidity may be provided by making a thickness of the first rib 56 (that is, a distance along the longitudinal direction of the shaft member 52) greater than a thickness of the second rib 58.

In addition, in each of the embodiments described above, the form example has been described in which the plurality of ribs 54 have the continuous annular shape, but the technology of the present disclosure is not limited to this. The plurality of ribs 54 may have a discontinuous annular shape. For example, a part or all of the plurality of ribs 54 may have a shape including a notch in a part in the circumferential direction (for example, the rib 54 may have a C-shape as viewed from the longitudinal direction of the shaft member 52).

The technology of the present disclosure can also be appropriately combined with various embodiments and/or various modification examples described above. Also, it is needless to say that the technology of the present disclosure is not limited to the embodiments described above, and various configurations can be employed without departing from the gist of the technology of the present disclosure.

The above described contents and shown contents are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. As a result, it is needless to say that unnecessary parts may be deleted, new elements may be added, or replacements may be made with respect to the above described contents and shown contents within a range that does not deviate from the gist of the technology of the present disclosure. In addition, in order to avoid complications and facilitate understanding of the parts according to the technology of the present disclosure, in the above described contents and shown contents, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

In regard to the embodiment described above, the following supplementary notes will be further disclosed.

Supplementary Note 1

A tape reel comprising a hub that has a cylindrical shape and around which a tape is wound, and a reinforcing member provided on an inner peripheral side of the hub, in which the reinforcing member includes a shaft member having a longitudinal direction along a central axis direction of the hub, and a plurality of ribs that are provided along the longitudinal direction and have an annular shape that extends from an outer peripheral surface of the shaft member toward an inner peripheral surface of the hub, and the plurality of ribs include a first rib provided in a central region in the longitudinal direction.

Supplementary Note 2

The tape reel according to Supplementary Note 1, in which the plurality of ribs include a second rib provided in a region other than the central region.

Supplementary Note 3

The tape reel according to Supplementary Note 2, in which the second rib is provided in each of a region between the central region and one end of the shaft member and a region between the central region and the other end of the shaft member.

Supplementary Note 4

The tape reel according to Supplementary Note 2 or 3, in which axial rigidity of the first rib is higher than axial rigidity of the second rib.

Supplementary Note 5

The tape reel according to any one of Supplementary Notes 1 to 3, in which a plurality of the first ribs are provided.

Supplementary Note 6

The tape reel according to Supplementary Note 5, in which an interval between the first ribs is narrower than an interval between the second rib and the first rib.

Supplementary Note 7

The tape reel according to any one of Supplementary Notes 1 to 6, in which an outer edge portion of the rib abuts against the inner peripheral surface.

Supplementary Note 8

The tape reel according to any one of Supplementary Notes 1 to 7, in which the rib has a continuous annular shape.

Supplementary Note 9

The tape reel according to any one of Supplementary Notes 1 to 8, in which the reinforcing member is press-fitted into the hub.

Supplementary Note 10

The tape reel according to any one of Supplementary Notes 1 to 9, in which the reinforcing member is bonded to the hub.

Supplementary Note 11

The tape reel according to any one of Supplementary Notes 1 to 10, in which a support surface on which a rotation shaft that rotates the tape reel is fixed or attached is provided on a bottom portion of the hub.

What is claimed is:

1. A tape reel comprising:
   a hub that has a cylindrical shape and around which a tape is wound; and
   a reinforcing member provided on an inner peripheral side of the hub,
   wherein the reinforcing member includes a shaft member having a longitudinal direction along a central axis direction of the hub, and a plurality of ribs that are provided along the longitudinal direction and have an annular shape that extends from an outer peripheral surface of the shaft member toward an inner peripheral surface of the hub, and
   the plurality of ribs include a first rib provided in a central region in the longitudinal direction.

2. The tape reel according to claim 1,
   wherein the plurality of ribs include a second rib provided in a region other than the central region.

3. The tape reel according to claim 2,
   wherein the second rib is provided in each of a region between the central region and one end of the shaft member and a region between the central region and the other end of the shaft member.

4. The tape reel according to claim 2,
   wherein axial rigidity of the first rib is higher than axial rigidity of the second rib.

5. The tape reel according to claim 2,
   wherein a plurality of the first ribs are provided.

6. The tape reel according to claim 5,
   wherein an interval between the first ribs is narrower than an interval between the second rib and the first rib.

7. The tape reel according to claim 1,
wherein an outer edge portion of the rib abuts against the inner peripheral surface.
8. The tape reel according to claim 1,
wherein the rib has a continuous annular shape.
9. The tape reel according to claim 1,
wherein the reinforcing member is press-fitted into the hub.
10. The tape reel according to claim 1,
wherein the reinforcing member is bonded to the hub.
11. The tape reel according to claim 1,
wherein a support surface on which a rotation shaft that rotates the tape reel is fixed or attached is provided on a bottom portion of the hub.
12. A magnetic tape cartridge comprising:
the tape reel according to claim 1 around which a magnetic tape is wound as the tape; and
a case in which the magnetic tape and the tape reel are accommodated.
13. A magnetic tape drive comprising:
the tape reel according to claim 1 around which a magnetic tape is wound as the tape; and
a magnetic head that reads the magnetic tape on a predetermined path in a state in which the magnetic tape is caused to travel by a travel mechanism that causes the magnetic tape to travel along the predetermined path.

* * * * *